United States Patent
Verdejo et al.

(10) Patent No.: US 9,845,752 B2
(45) Date of Patent: Dec. 19, 2017

(54) SYSTEMS AND METHODS FOR DETERMINING CRANKSHAFT POSITION BASED INDICATED MEAN EFFECTIVE PRESSURE (IMEP)

(75) Inventors: Julian R. Verdejo, Farmington, MI (US); Nicholas John Kalweit, Novi, MI (US); John V. Bowman, Farmington, MI (US); David S. Mathews, Howell, MI (US); Jeffrey A. Morgan, Macomb, MI (US); Tameem K. Assaf, Milford, MI (US); James R. Reeder, Jr., Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1020 days.

(21) Appl. No.: 12/984,818

(22) Filed: Jan. 5, 2011

(65) Prior Publication Data

US 2012/0078485 A1     Mar. 29, 2012

Related U.S. Application Data

(60) Provisional application No. 61/387,731, filed on Sep. 29, 2010.

(51) Int. Cl.
*F02D 35/02* (2006.01)
*F02D 41/00* (2006.01)
*G01M 15/06* (2006.01)

(52) U.S. Cl.
CPC .......... *F02D 41/009* (2013.01); *F02D 35/023* (2013.01); *F02D 2200/101* (2013.01); *F02D 2200/1004* (2013.01); *G01M 15/06* (2013.01)

(58) Field of Classification Search
CPC ... F02D 35/023; G01M 15/06; F01L 13/0031; F01L 1/2405; F01L 2800/11
USPC ........ 701/101, 102, 110, 111, 115; 123/406.12, 406.13, 406.24, 406.27, 123/406.32, 406.58, 406.59
See application file for complete search history.

(56) References Cited

U.S. PATENT DOCUMENTS

| | | | |
|---|---|---|---|
| 3,923,021 | A | 12/1975 | Stark |
| 4,233,943 | A | 11/1980 | Rogora et al. |

(Continued)

FOREIGN PATENT DOCUMENTS

| | | |
|---|---|---|
| CN | 1204003 A | 1/1999 |
| CN | 101074634 A | 11/2007 |

(Continued)

OTHER PUBLICATIONS

U.S. Appl. No. 12/357,776, filed Jan. 22, 2009, Verdejo et al.

(Continued)

*Primary Examiner* — Hai Huynh
*Assistant Examiner* — Gonzalo Laguarda (57) ABSTRACT

A system for a vehicle includes a filtering module and an indicated work module. The filtering module generates engine speeds based on positions of teeth of a toothed wheel that rotates with a crankshaft and based on a crankshaft position signal generated by a crankshaft position sensor. The crankshaft position sensor generates the crankshaft position signal based on rotation of the toothed wheel. The indicated work module generates an indicated work for a combustion cycle of a cylinder of an engine based on squares of first and second ones of the engine speeds and outputs the indicated work.

9 Claims, 6 Drawing Sheets

(56) References Cited

U.S. PATENT DOCUMENTS

| | | | |
|---|---|---|---|
| 4,525,781 A | 6/1985 | Konomi et al. | |
| 4,658,787 A | 4/1987 | Takizawa | |
| 4,760,825 A | 8/1988 | Morita | |
| 4,788,942 A | 12/1988 | Pouring et al. | |
| 4,915,076 A | 4/1990 | Takizawa | |
| 5,046,468 A | 9/1991 | Erhard | |
| 5,107,813 A | 4/1992 | Inoue et al. | |
| 5,229,945 A | 7/1993 | Demizu et al. | |
| 5,408,863 A | 4/1995 | Sawyers et al. | |
| 5,632,247 A | 5/1997 | Hashizume et al. | |
| 5,699,253 A | 12/1997 | Puskorius et al. | |
| 5,715,794 A * | 2/1998 | Nakamura et al. | 123/305 |
| 5,732,382 A | 3/1998 | Puskorius et al. | |
| 5,771,482 A | 6/1998 | Rizzoni | |
| 5,905,193 A | 5/1999 | Hashizume et al. | |
| 6,023,651 A | 2/2000 | Nakayama et al. | |
| 6,085,143 A | 7/2000 | Przymusinski et al. | |
| 6,415,656 B1 | 7/2002 | Bidner et al. | |
| 6,668,812 B2 | 12/2003 | Javaherian | |
| 6,691,653 B2 | 2/2004 | Denz | |
| 6,752,009 B2 * | 6/2004 | Minich et al. | 73/114.27 |
| 6,758,179 B1 | 7/2004 | McKay et al. | |
| 6,866,024 B2 | 3/2005 | Rizzoni et al. | |
| 6,999,868 B2 | 2/2006 | Funke et al. | |
| 7,024,304 B2 | 4/2006 | Fukasawa et al. | |
| 7,047,125 B1 | 5/2006 | He et al. | |
| 7,063,057 B1 | 6/2006 | Waters et al. | |
| 7,117,080 B2 * | 10/2006 | Sobel | 701/114 |
| 7,133,766 B2 | 11/2006 | Kokubo | |
| 7,197,916 B2 | 4/2007 | Matsumoto et al. | |
| 7,243,532 B2 | 7/2007 | Tsujimura et al. | |
| 7,246,583 B2 | 7/2007 | Cinpinski et al. | |
| 7,251,557 B2 | 7/2007 | Strom et al. | |
| 7,325,446 B1 | 2/2008 | Assaf et al. | |
| 7,353,803 B2 | 4/2008 | Mathews et al. | |
| 7,437,233 B2 | 10/2008 | Yasui et al. | |
| 7,451,739 B2 | 11/2008 | Yasui et al. | |
| 7,469,678 B2 | 12/2008 | Ruiz | |
| 7,500,470 B2 | 3/2009 | Buslepp et al. | |
| 7,530,261 B2 | 5/2009 | Walters | |
| 7,607,415 B2 | 10/2009 | Mathews et al. | |
| 7,623,955 B1 | 11/2009 | Rackmil et al. | |
| 7,654,248 B2 | 2/2010 | Buslepp et al. | |
| 7,665,558 B2 | 2/2010 | Akimoto et al. | |
| 7,698,935 B2 | 4/2010 | Dibble et al. | |
| 7,784,443 B2 | 8/2010 | Hitomi et al. | |
| 7,861,689 B2 | 1/2011 | Haug et al. | |
| 7,918,212 B2 | 4/2011 | Verdejo et al. | |
| 8,027,782 B2 | 9/2011 | Assaf et al. | |
| 8,176,896 B2 | 5/2012 | Verdejo et al. | |
| 8,251,043 B2 | 8/2012 | Smith | |
| 8,307,808 B2 | 11/2012 | Kaiser et al. | |
| 8,392,096 B2 | 3/2013 | Mathews et al. | |
| 8,478,511 B2 | 7/2013 | Hamama et al. | |
| 8,532,908 B2 | 9/2013 | Morgan et al. | |
| 2004/0236496 A1 | 11/2004 | Sobel | |
| 2005/0039721 A1 | 2/2005 | Truscott et al. | |
| 2005/0056240 A1 | 3/2005 | Sugiyama et al. | |
| 2005/0204805 A1 | 9/2005 | Wakahara et al. | |
| 2006/0112933 A1 | 6/2006 | Yasui et al. | |
| 2006/0124107 A1 | 6/2006 | Sauler et al. | |
| 2006/0241848 A1 | 10/2006 | Strom et al. | |
| 2006/0254560 A1 | 11/2006 | Mann et al. | |
| 2007/0068474 A1 | 3/2007 | Cinpinski et al. | |
| 2007/0239343 A1 | 10/2007 | Okubo et al. | |
| 2007/0295290 A1 | 12/2007 | Cao | |
| 2008/0006244 A1 | 1/2008 | Asano et al. | |
| 2008/0077307 A1 | 3/2008 | Wiles | |
| 2008/0178844 A1 | 7/2008 | Naegele et al. | |
| 2008/0183367 A1 | 7/2008 | Kapus et al. | |
| 2008/0283025 A1 | 11/2008 | Sato | |
| 2008/0312810 A1 | 12/2008 | Nonoyama | |
| 2009/0048729 A1 | 2/2009 | Waters et al. | |
| 2009/0259382 A1 | 10/2009 | McKay et al. | |
| 2009/0276142 A1 | 11/2009 | Leone et al. | |
| 2009/0276143 A1 | 11/2009 | Rackmil et al. | |
| 2009/0276147 A1 | 11/2009 | Hamama et al. | |
| 2010/0012079 A1 | 1/2010 | Nakazono et al. | |
| 2010/0037859 A1 | 2/2010 | Mashiki | |
| 2010/0063712 A1 | 3/2010 | Bromberg et al. | |
| 2010/0083936 A1 | 4/2010 | Verdejo et al. | |
| 2010/0088010 A1 | 4/2010 | Verdejo et al. | |
| 2010/0094528 A1 | 4/2010 | Auclair et al. | |
| 2010/0192905 A1 | 8/2010 | Lewis et al. | |
| 2010/0294027 A1 | 11/2010 | Kondo et al. | |
| 2011/0139120 A1 | 6/2011 | Rollinger et al. | |
| 2011/0224882 A1 | 9/2011 | Makino et al. | |
| 2011/0246049 A1 | 10/2011 | Matsuo et al. | |
| 2011/0253100 A1 | 10/2011 | Kaiser et al. | |
| 2011/0283972 A1 | 11/2011 | Wermuth et al. | |
| 2012/0048234 A1 | 3/2012 | Hamama et al. | |
| 2012/0078485 A1 | 3/2012 | Verdejo et al. | |
| 2012/0209494 A1 * | 8/2012 | Verdejo et al. | 701/102 |
| 2013/0054109 A1 | 2/2013 | Buslepp et al. | |

FOREIGN PATENT DOCUMENTS

| | | |
|---|---|---|
| CN | 101331305 A | 12/2008 |
| DE | 4040648 A1 | 1/1992 |
| DE | 4445684 C2 | 6/2000 |
| DE | 19931985 A1 | 1/2001 |
| DE | 102005006997 A1 | 8/2006 |
| DE | 102008054690 A1 | 6/2010 |
| DE | 102009008247 B3 | 8/2010 |
| JP | 2009174397 A | 8/2009 |
| JP | 2009275663 A | 11/2009 |

OTHER PUBLICATIONS

U.S. Appl. No. 12/478,159, filed Jun. 4, 2009, Verdejo et al.
U.S. Appl. No. 12/762,523, filed Apr. 19, 2010, Mathews et al.
Chinese Search Report dated Sep. 27, 2012 for Chinese Application No. CN201110097845.3, (2 pages).
U.S. Appl. No. 12/762,516, filed Apr. 19, 2010, Kaiser et al.
U.S. Appl. No. 13/024,726, filed Feb. 10, 2011, Verdejo et al.
U.S. Appl. No. 13/590,351, filed Aug. 21, 2012, Betz.
U.S. Appl. No. 13/590,369, filed Aug. 21, 2012, Betz.
Chinese Search Report for corresponding Chinese Application No. CN201110097845.3, (2 pages).
O'Reilly Auto Parts; Possible Cause of Engine Misfire: http://oreillyauto.com/site/app/newsfeed/detail?article=800649141; Nov. 23, 2011.
Tim Gilles; Automobile Service; Inspection, Maintenance, and Repair; Jun. 12, 2003; Delmar Learning; Second Edition; p. 560.
ECU Manager User's Guide; V1.01; Based on: ECU Manager v3.0.9.7 Firmware v3.16.34; Apr. 22, 2009; 32 pages.
German Office Action dated Apr. 11, 2017 from the German Patent Office for Serial No. 10 2011 114 109.3; 6 pages.

* cited by examiner

SYSTEMS AND METHODS FOR DETERMINING CRANKSHAFT POSITION BASED INDICATED MEAN EFFECTIVE PRESSURE (IMEP)

CROSS-REFERENCE TO RELATED APPLICATIONS

This application claims the benefit of U.S. Provisional Application No. 61/387,731, filed on Sep. 29, 2010. The disclosure of the above application is incorporated herein by reference in its entirety.

FIELD

The present disclosure is related to internal combustion engines and more particularly to indicated mean effective pressure (IMEP).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine control systems monitor crankshaft position. Rotational speed of the crankshaft (engine speed) and crankshaft acceleration can be determined based on the crankshaft position. For example only, fueling, ignition timing, throttle opening, and/or other engine parameters may be controlled based on the crankshaft position, the engine speed, and/or the acceleration.

A crankshaft position monitoring system typically includes a control module (e.g., an engine control module), a crankshaft sensor, and a toothed wheel that rotates with a crankshaft. The toothed wheel may have N number of teeth, and the crankshaft sensor may monitor passing of the teeth. The crankshaft sensor generates pulses in a crankshaft position signal as the teeth of the toothed wheel pass the crankshaft sensor.

The control module determines the crankshaft position based on the pulses in the crankshaft position signal. The control module may determine the crankshaft position at various crankshaft rotation intervals. As an example, the control module may determine the crankshaft position at intervals of greater than or equal to 90° of crankshaft rotation. The resolution of the crankshaft position signal (e.g., number of samples per crankshaft revolution) increases as the intervals decrease.

SUMMARY

A system for a vehicle includes a filtering module and an indicated work module. The filtering module generates engine speeds based on positions of teeth of a toothed wheel that rotates with a crankshaft and based on a crankshaft position signal generated by a crankshaft position sensor. The crankshaft position sensor generates the crankshaft position signal based on rotation of the toothed wheel. The indicated work module generates an indicated work for a combustion cycle of a cylinder of an engine based on squares of first and second ones of the engine speeds and outputs the indicated work.

A method includes: generating engine speeds based on positions of teeth of a toothed wheel that rotates with a crankshaft and based on a crankshaft position signal generated by a crankshaft position sensor, generating an indicated work for a combustion cycle of a cylinder of an engine based on squares of first and second ones of the engine speeds, and outputting the indicated work. The crankshaft position sensor generates the crankshaft position signal based on rotation of the toothed wheel.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A crankshaft position sensor generates pulses as teeth of an N-toothed wheel pass the crankshaft position sensor. The N-toothed wheel rotates with a crankshaft of the engine. A control module, such as an engine control module (ECM), receives the pulses and determines a rotational speed of the crankshaft based on the period between two pulses and the rotational distance between the teeth associated with the two pulses. A rotational speed determined based on a period between two pulses that are separated by a rotational distance of greater than or equal to 90° may be referred to as a low resolution speed. A rotational speed determined based on a period between two pulses that are separated by a rotational distance of less than 90° may be referred to as a high resolution speed.

The N-toothed wheel may have space for, for example, 60 equally spaced teeth (i.e., N=60). The N-toothed wheel may include 58 teeth that are approximately equally spaced and a gap where 2 approximately equally spaced teeth are missing. Accordingly, a given point (e.g., an edge) of each of the teeth (including the missing teeth) may be separated by a rotational distance of approximately 6° (360°/60=6°). However, the rotational distance between the given point of consecutive teeth may vary. In other words, variation in the rotational distance between the given point of two consecutive teeth may exist. The variation may be due to, for example, manufacturing tolerances, part-to-part variation, wear, and/or one or more other sources.

The ECM selectively learns the rotational distance between each pair of consecutive teeth of the N-toothed wheel. Based on the learned distances and the period between pulses in the crankshaft position signal, the control module generates an engine speed signal. The ECM also applies a filter to the engine speed signal. The engine speed signal corresponds to the instantaneous engine speed at a given crankshaft position.

The ECM of the present disclosure determines an indicated work for a combustion cycle of a cylinder based on squares of two or more instantaneous engine speeds at predetermined crankshaft positions of the combustion cycle. The ECM determines an indicated mean effective pressure (IMEP) for the combustion cycle of the cylinder based on the indicated work. The ECM may use the IMEP, for example, in determining whether misfire occurred within the cylinder, adjusting fueling to the cylinder during a future combustion cycle, adjusting ignition timing during a future combustion cycle of the cylinder, and/or taking one or more other actions.

Figure 1:
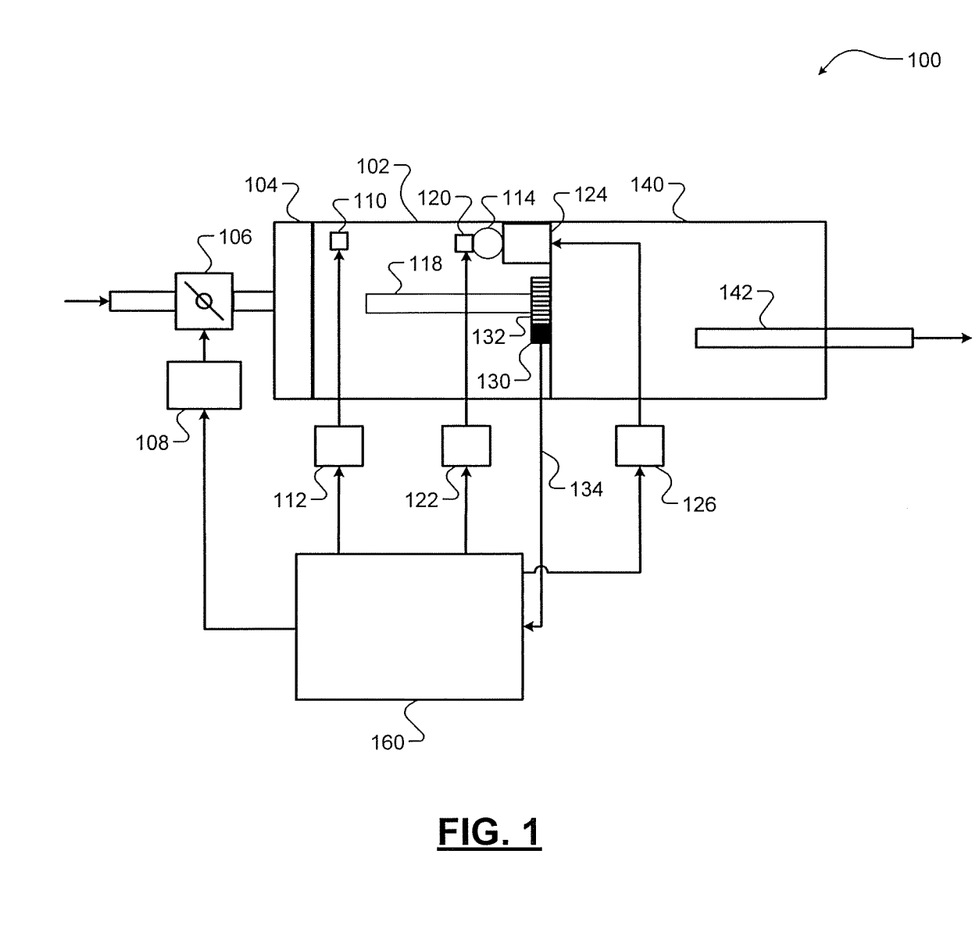
FIGS. 1-3 are functional block diagrams of example control systems according to the principles of the present disclosure.

Referring now to FIG. 1, a functional block diagram of an example vehicle system 100 is presented. An engine 102 generates torque for a vehicle. Air is drawn into the engine 102 through an intake manifold 104. Airflow into the engine 102 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s).

A cylinder 114 includes a piston (not shown) that is coupled to a crankshaft 118. Although the engine 102 is depicted as including only the cylinder 114, the engine 102 may include more than one cylinder. One combustion cycle of the cylinder 114 may include four strokes: an intake stroke, a compression stroke, an expansion stroke, and an exhaust stroke. One engine cycle includes each of the cylinders undergoing one combustion cycle.

During the intake stroke, the piston is lowered to a bottom most position, and the air and fuel may be provided to the cylinder 114. The bottom most position may be referred to as a bottom dead center (BDC) position. During the compression stroke, the crankshaft 118 drives the piston toward a top most position, thereby compressing the air/fuel mixture within the cylinder 114. The top most position may be referred to as a top dead center (TDC) position. A spark plug 120 may ignite the air/fuel mixture in various types of engines. A spark actuator module 122 controls the spark plug 120.

Combustion of the air/fuel mixture drives the piston back toward the BDC position during the expansion stroke, thereby rotatably driving the crankshaft 118. The rotational force (i.e., torque) may be a source of compressive force for a compression stroke of a combustion cycle of a next cylinder in a predetermined firing order. Exhaust gas resulting from the combustion of the air/fuel mixture is expelled from the cylinder 114 during the exhaust stroke. A camshaft phaser 124 controls opening of the intake and/or exhaust valve(s) of the cylinder 114. More specifically, the camshaft phaser 124 controls rotation of a camshaft (not shown) to control opening of the intake and/or exhaust valve(s). A phaser actuator module 126 controls the camshaft phaser 124.

A crankshaft position sensor 130 monitors an N-toothed wheel 132 and generates a crankshaft position signal 134 based on rotation of the N-toothed wheel 132. For example only, the crankshaft position sensor 130 may include a variable reluctance (VR) sensor or another suitable type of crankshaft position sensor. The N-toothed wheel 132 rotates with the crankshaft 118. The N-toothed wheel 132 includes space for N equally spaced teeth.

The crankshaft position sensor 130 generates a pulse in the crankshaft position signal 134 each time when a tooth of the N-toothed wheel 132 (e.g., rising or falling edge of the tooth) passes the crankshaft position sensor 130. Accordingly, each pulse in the crankshaft position signal 134 may correspond to an angular rotation of the crankshaft 118 by an amount equal to 360° divided by N. For example only, the N-toothed wheel 132 may include space for 60 equally spaced teeth (i.e., N=60), and each pulse in the crankshaft position signal 134 may therefore correspond to approximately 6° of crankshaft rotation. In various implementations, one or more of the N teeth may be omitted. For example only, two of the N teeth may be omitted in various implementations.

The engine 102 transfers torque to a transmission 140. The transmission 140 may include a manual type transmission, an automatic type transmission, an auto-manual type transmission, or another suitable type of transmission. The transmission 140 may transfer torque to one or more wheels (not shown) via a transmission output shaft 142 and a driveline (not shown).

While the rotational distance between consecutive teeth of the N-toothed wheel 132 should be equal (e.g., 6° in the above example), the rotational distances between consecutive teeth may vary. The variation may be due to, for example, manufacturing tolerances, part-to-part variation, wear, sensor variation, and/or one or more other sources.

An engine control module (ECM) 160 selectively learns the distance between each pair of consecutive teeth of the N-toothed wheel 132. Based on the learned distances and the crankshaft position signal 134, the ECM 160 generates a second crankshaft position signal. The ECM 160 generates an engine speed signal based on the second crankshaft position signal. The engine speed signal at a given crankshaft position indicates the instantaneous engine speed at the crankshaft position.

The ECM 160 determines an indicated work of a combustion cycle of the cylinder 114 based on squares of two or more instantaneous engine speeds at predetermined crankshaft positions of the combustion cycle, respectively. The ECM 160 determines the indicated mean effective pressure (IMEP) of the combustion cycle of the cylinder 114 based on the indicated work and the displacement volume of the engine 102.

Based on the IMEP, the ECM 160 may determine an individual cylinder fuel correction (ICFC) for a future combustion cycle of the cylinder 114, diagnose whether engine misfire occurred during the combustion cycle, diagnose whether one or more faults are present, and/or determine a drivability index (DI) of the fuel. Based on the IMEP, the ECM 160 may additionally or alternatively control one or more engine operating parameters. For example only, engine operating parameters may include camshaft phasing based on a crankshaft angle at which 50% of the fuel will be burnt (CA50) within the cylinder 114, intake and/or valve actuation, ignition timing, and/or one or more other suitable engine operating parameters. The ECM 160 may additionally or alternatively perform one or more other suitable actions based on the IMEP.

Figure 2:
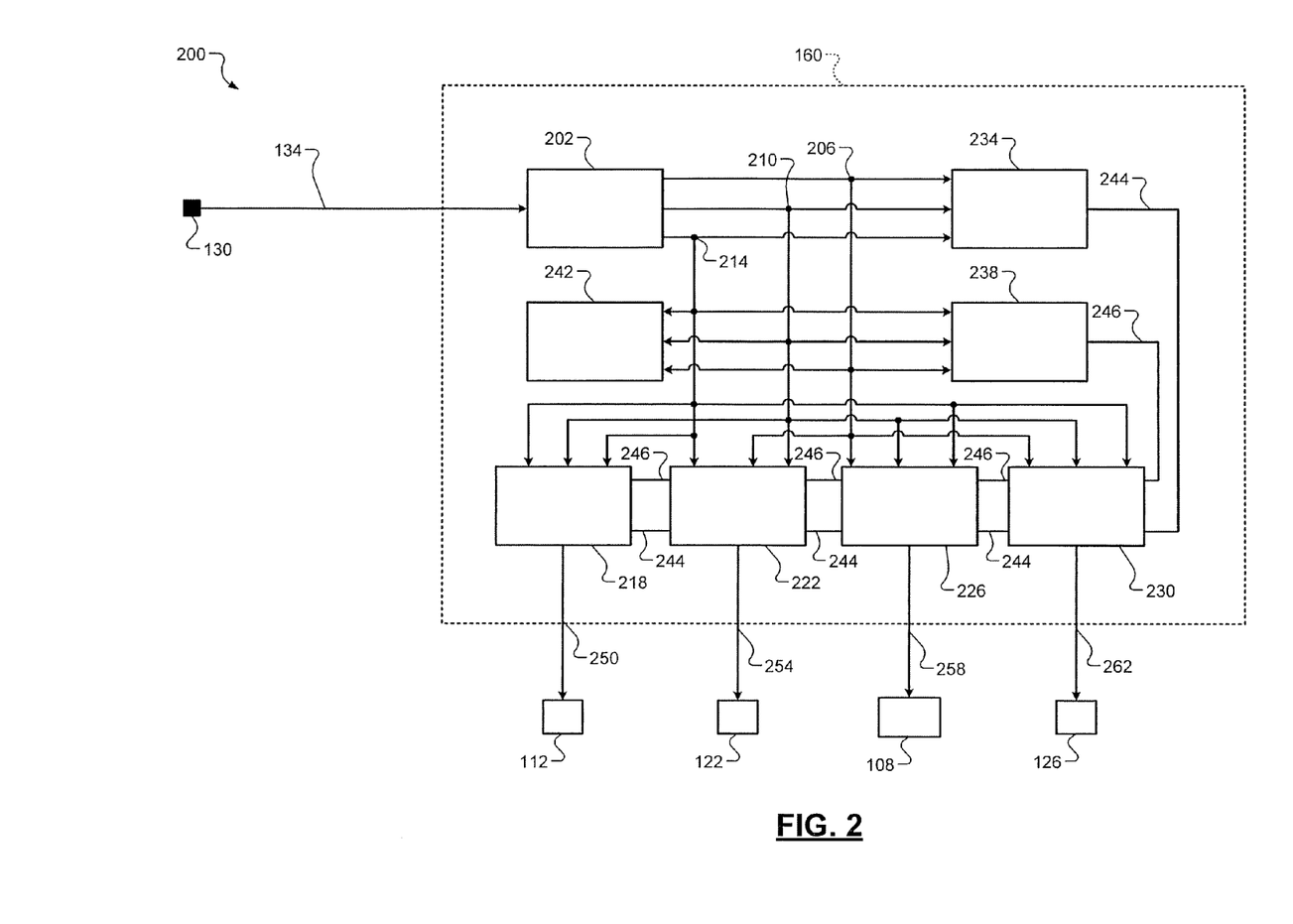

Referring now to FIG. 2, a functional block diagram of an example control system 200 is shown. The control system 200 includes the ECM 160 and the crankshaft position sensor 130. The ECM 160 includes a filter module 202 that generates estimates of the (instantaneous) crankshaft position, the (instantaneous) engine speed, and the crankshaft acceleration based on the crankshaft position signal 134. The filter module 202 generates a crankshaft position signal 206, an engine speed signal 210, and an acceleration signal 214 to indicate the estimates, respectively. The filter module 202 may generate the estimates using, for example, a Kalman based filter, a Chebyshev based filter, a Butterworth type II based filter, or another suitable type of filter. The filter module 202 is discussed in detail below in conjunction with the example embodiment of FIG. 4.

The crankshaft position signal 206, the engine speed signal 210, and/or the acceleration signal 214 may be provided to one or more modules. The modules may include, for example, a fuel control module 218, an ignition control module 222, a throttle control module 226, a phaser control module 230, an engine combustion module 234, a misfire module 238, fault detection modules 242, and/or one or more other suitable modules.

The engine combustion module 234 determines combustion information for combustion cycles of the cylinders of the engine 102 based on the crankshaft position signal 206, the engine speed signal 210, and/or the acceleration signal 214. The combustion information is collectively illustrated by 244. For example only, the engine combustion module 234 determines an indicated work for a combustion cycle of the cylinder 114 based on squares of two or more instantaneous engine speeds at predetermined crankshaft positions of the combustion cycle, respectively. The engine combustion module 234 also determines an indicated work for each other combustion cycle of the cylinder 114.

The engine combustion module 234 determines the IMEP for a combustion cycle of the cylinder 114 based on the indicated work for the combustion cycle. The engine combustion module 234 determines the IMEP for the combustion cycle of the cylinder 114 further based on the displacement volume of the engine 102. The engine combustion module 234 also determines the indicated work and the IMEP for each combustion event of each of the other cylinders of the engine 102. The engine combustion module 234 is discussed in detail below in conjunction with the example embodiment of FIG. 5.

The misfire module 238 may generate misfire information based on the crankshaft position signal 206, the engine speed signal 210, and/or the acceleration signal 214. The misfire information is collectively illustrated by 246. The combustion information 244 and/or misfire information 246 may be used, for example, to adjust fueling and/or timing, spark timing, opening of the throttle valve 106, intake and/or exhaust valve actuation, and/or one or more other engine operating parameters. For example only, the fuel control module 218, the ignition control module 222, the throttle control module 226, and the phaser control module 230 may generate signals 250, 254, 258, and 262 provided to the fuel actuator module 112, the spark actuator module 122, the throttle actuator module 108, and the phaser actuator module 126, respectively, based on the combustion information 244 and/or the misfire information 246.

The fuel actuator module 112 controls fuel injection and timing based on the signal 250. The spark actuator module 122 controls spark timing based on the signal 254 in spark-ignition type engines. The throttle actuator module 108 controls opening of the throttle valve 106 based on the signal 258. The phaser actuator module 126 controls the camshaft phaser 124 based on the signal 262. The phaser actuator module 126 may also control one or more of intake valve timing and duration, exhaust valve timing and duration, variable valve lift, variable valve timing, variable valve actuation, etc. The fault detection modules 242 may selectively diagnose the presence of one or more faults based on the crankshaft position signal 206, the engine speed signal 210, the acceleration signal 214, the combustion information 244, and/or the misfire information 246.

Figure 3:
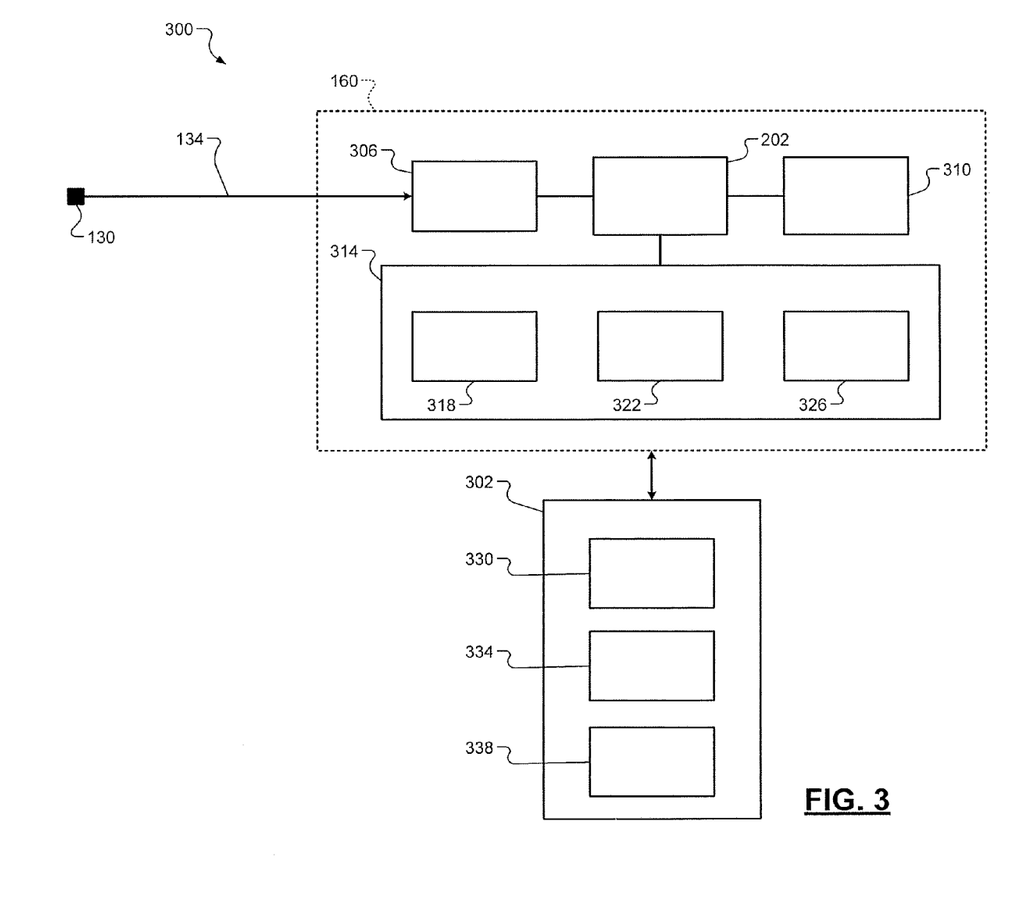

Referring now to FIG. 3, a functional block diagram of another control system 300 is presented. The control system 300 includes the ECM 160 and memory 302. In various implementations, the memory 302 may be implemented within the ECM 160. The ECM 160 includes a time recording module 306, the filter module 202, a velocity setting module 310, and a position history module 314. The position history module 314 includes a constant acceleration module 318, a constant jerk module 322, and an exponential decay module 326. The memory 302 includes timestamp arrays 330, teeth position arrays 334, and a consolidated teeth position array 338.

The time recording module 306 records timestamps for each pulse in the crankshaft position signal 134, for example, during a crankshaft deceleration event. The timestamps may be recorded during a tooth learn procedure. Each of the timestamps may be associated with one of the teeth of the N-toothed wheel 132. Crankshaft position, engine speed, and/or acceleration information may be obtained based on the stored timestamps.

The timestamps may be stored in the timestamp arrays 330. The timestamp arrays 330 may include one timestamp array 330 for each of the N teeth of the N-toothed wheel 132, and the timestamps may be stored by tooth in the associated timestamp array 330. In this manner, a given timestamp array may include timestamps for the associated tooth for one or more revolutions of the N-toothed wheel 132. Each of the N timestamp arrays includes M entries where a timestamp is or can be stored. Each of the M entries is associated with a particular engine cycle (i.e., 2 revolutions of the N-toothed wheel 132).

The filter module 202 may operate based on information from the time recording module 306, the velocity setting module 310, the position history module 314, and/or the memory 302. The modules 218-242, of FIG. 2, may also operate based on information from the time recording module 306, the velocity setting module 310, the position history module 314, and/or the memory 302.

The velocity setting module 310 may be used to control engine speed for a tooth learning procedure. The tooth learning procedure may involve determining the position (e.g., crankshaft angle degrees) of each tooth of the N-toothed wheel 132 (e.g., a falling edge of the tooth). The position of each tooth may be used to determine the rotational distance between successive teeth. The position history module 314 may perform the tooth learning procedure and determine the positions based on the timestamps stored in the timestamp arrays 330. The positions may each be stored in the teeth position arrays 334.

The teeth position arrays 334 may include N tooth position arrays 334 where N is equal to the N of the N-toothed wheel 132. Each of the N tooth position arrays 334 includes X entries where a crankshaft position is or can be stored. Each of the X entries is associated with a particular engine cycle. The positions can be determined via the constant acceleration module 318, the constant jerk module 322, and/or the exponential decay module 326.

The position history module 314 may average the X position entries of each of the N tooth position arrays of the teeth position arrays 334 to determine N average positions. Each of the N average positions corresponds to an average of the X position entries determined for the associated tooth of the N-toothed wheel 132. The N average positions may each be stored in one of N arrays in the consolidated teeth position array 338.

Figure 4:
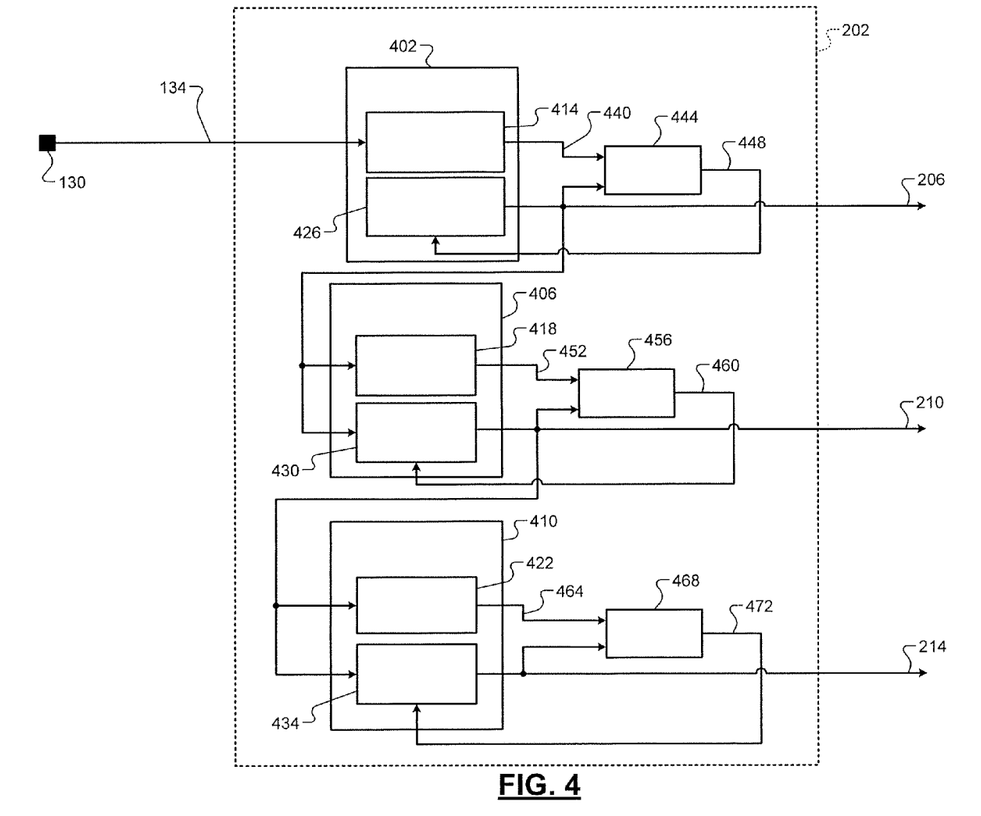
FIG. 4 is a functional block diagram of an example filter module according to the principles of the present disclosure.

Referring now to FIG. 4, a functional block diagram of an example implementation of the filter module 202 is presented. The filter module 202 may include, for example, a Kalman filter, a Butterworth type II filter, a Chebyshev filter, or another suitable type of filter. In the case of the filter module 202 including a Kalman filter, the filter module 202 may include a state estimator that is used to determine or estimate instantaneous crankshaft position, instantaneous engine speed, and (average) crankshaft acceleration.

Functions (e.g., equations) describing the dynamics of the engine 102 are defined. The functions are used to produce estimates of state variables (e.g., instantaneous crankshaft position, instantaneous engine speed, and crankshaft acceleration). The estimates are compared to measured values of the state variables to generate error signals, respectively, which are fed back to correct future estimates of the state variables. For example, the error between estimated and measured instantaneous engine speed is fed back to correct future estimates of the instantaneous engine speed.

The filter module 202 may include a position filtering module 402, a speed filtering module 406, and an acceleration filtering module 410. The position, speed, and acceleration filtering modules 402, 406, and 410 include position, speed, and acceleration calculator modules 414, 418, and 422, respectively. The position, speed, and acceleration filtering modules 402, 406, and 410 also include position, speed, and acceleration estimator modules 426, 430, and 434, respectively. The outputs of the estimator modules 426, 430, and 434 are the crankshaft position signal 206, the engine speed signal 210, and the acceleration signal 214, respectively. The position, speed, and acceleration filtering modules 402, 406, and 410 may operate based on information from the time recording module 306, the velocity setting module 310, the position history module 314, and/or the memory 302 of FIG. 3.

The position calculator module 414 receives the crankshaft position signal 134 from the crankshaft position sensor 130. The position calculator module 414 generates a second crankshaft position signal 440 based on the crankshaft position signal 134. The position estimator module 426 outputs the crankshaft position signal 206.

An error module 444 generates a position error signal 448 based on a difference between the crankshaft position signal 206 and the second crankshaft position signal 440. The position error signal 448 is fed back to the position estimator module 426, and the position estimator module 426 may selectively adjust the crankshaft position signal 206 in the future based on the position error signal 448.

The speed calculator module 418 receives the crankshaft position signal 206. The speed calculator module 418 generates a second engine speed signal 452 based on the crankshaft position signal 206. The speed estimator module 430 outputs the engine speed signal 210.

An error module 456 generates a speed error signal 460 based on a difference between the engine speed signal 210 and the second engine speed signal 452. The speed error signal 460 is fed back to the speed estimator module 430, and the speed estimator module 430 may adjust the engine speed signal 210 in the future based on the speed error signal 460.

The acceleration calculator module 418 receives the engine speed signal 210. The acceleration calculator module 418 generates a second acceleration signal 464 based on the engine speed signal 210. The acceleration estimator module 434 outputs the acceleration signal 214.

An error module 468 generates an acceleration error signal 472 based on a difference between the acceleration signal 214 and the second acceleration signal 464. The acceleration error signal 472 is fed back to the acceleration estimator module 434, and the acceleration estimator module 434 may adjust the acceleration signal 214 in the future based on the acceleration error signal 472. The engine speeds 210 may be stored by crankshaft position 206, for example in memory. The accelerations 214 and/or the crankshaft positions 206 may also be stored.

Figure 5:
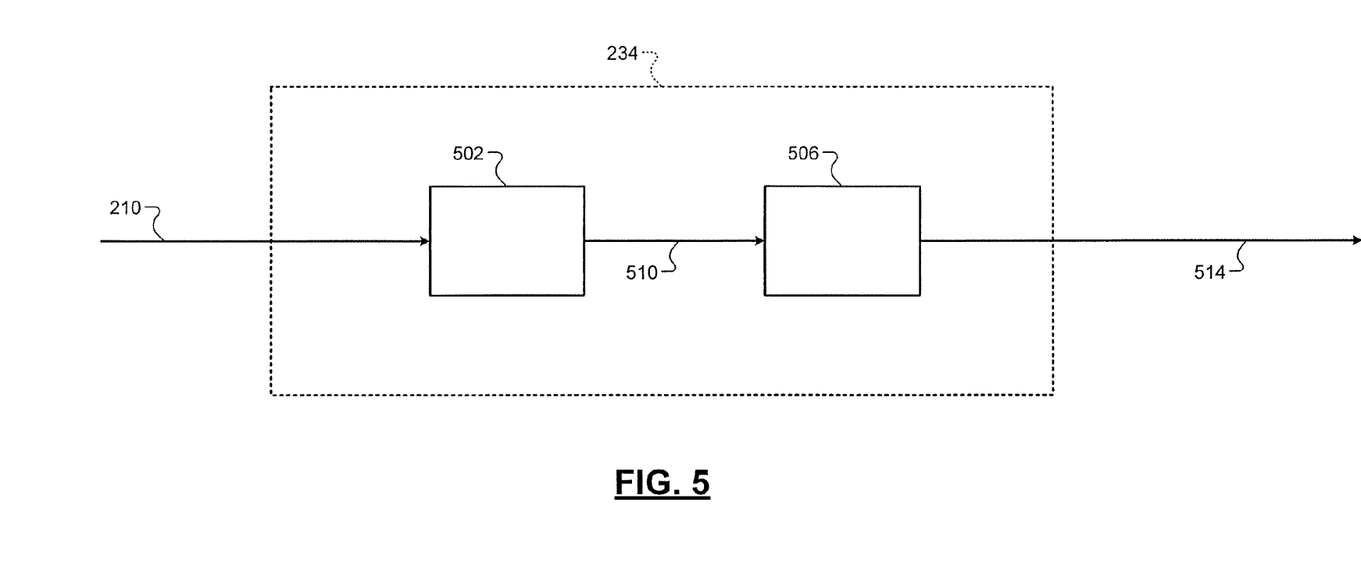
FIG. 5 is a functional block diagram of an example engine combustion module according to the principles of the present disclosure.

Referring now to FIG. 5, a functional block diagram of an example implementation of the engine combustion module 234 is presented. The engine combustion module 234 may include an indicated work determination module 502 and an IMEP determination module 506.

The indicated work determination module 502 receives the engine speed signal 210 from the filter module 202. The indicated work determination module 502 determines an indicated work 510 for a combustion cycle of the cylinder 114 based on squares of two or more of the engine speeds 210 at predetermined crankshaft positions, respectively, of the combustion cycle. The indicated work determination module 502 determines an indicated work 510 for each combustion cycle of the cylinder 114 and may determine an indicated work 510 for each combustion cycle of each other cylinder of the engine 102.

For a first example only, the indicated work determination module 502 may determine the indicated work 510 for a combustion cycle of the cylinder 114 using the equation:

$$W = \omega_e^2 - \omega_s^2, \tag{1}$$

where W is the indicated work, $\omega_e$ is a first engine speed 210 at a first predetermined crankshaft position of the expansion stroke of the combustion cycle of the cylinder 114, and $\omega_s$ is a second engine speed 210 at a second predetermined crankshaft position of the expansion stroke. The first predetermined crankshaft position is later in the expansion stroke (i.e., further from TDC) than the second predetermined crankshaft position. For example only, the first and second predetermined crankshaft positions may be approximately 36 crankshaft angle degrees (CAD) after TDC and 30 CAD after TDC, respectively, 40 CAD after TDC and 20 CAD after TDC, respectively, or other suitable crankshaft positions. In various implementations, the first predetermined crankshaft position is during the compression stroke, and the second predetermined crankshaft position is after first predetermined crankshaft position during the expansion stroke.

For a second example only, the indicated work determination module 502 may determine the indicated work 510 for a combustion cycle of the cylinder 114 using the equation:

$$W = p*(\omega_e^2 - \omega_s^2) + q, \tag{2}$$

where W is the indicated work, $\omega_e$ is a first engine speed 210 at a first predetermined crankshaft position of the expansion stroke of the combustion cycle of the cylinder 114, $\omega_s$ is a second engine speed 210 at a second predetermined crankshaft position of the expansion stroke, p is a predetermined (e.g., calibrated) gain, and q is a predetermined (e.g., calibrated) offset. The first predetermined crankshaft position is later in the expansion stroke than the second predetermined crankshaft position. In various implementations, the first predetermined crankshaft position is during the compression stroke, and the second predetermined crankshaft position is after first predetermined crankshaft position during the expansion stroke.

Equation (2) can be written in matrix form as:

$$W = [(\omega_e^2 - \omega_s^2) \ 1] * \begin{bmatrix} p \\ q \end{bmatrix}. \tag{3}$$

For a large data set over Z combustion cycles, equation (3) can be expanded to:

$$\begin{bmatrix} W_1 \\ W_2 \\ \vdots \\ W_Z \end{bmatrix} = \begin{bmatrix} (\omega_{1e}^2 - \omega_{1s}^2) & 1 \\ (\omega_{2e}^2 - \omega_{2s}^2) & 1 \\ \vdots & \\ (\omega_{Ze}^2 - \omega_{Zs}^2) & 1 \end{bmatrix} * \begin{bmatrix} p \\ q \end{bmatrix}. \tag{4}$$

The predetermined gain (p) and the predetermined offset (q) used by the indicated work determination module 502 in determining the indicated work 510 can be determined by collecting measured cylinder pressure data (using a cylinder pressure sensor not shown in FIG. 1), collecting the engine speed 210 data ($\omega_1$, $\omega_2$, ...) at various crankshaft positions (at least e and s), determining the indicated works ($W_1$, $W_2$, ...) based on the measured cylinder pressure data, and solving equation (4) for the predetermined gain and the predetermined offset. For example only, the predetermined gain and the predetermined offset may be determined by solving equation (4) using a regression fit analysis. Once the predetermined gain and the predetermined offset have been determined, the indicated work determination module 502 can determine the indicated work 510 during operation of the engine 102 without measured cylinder pressure data and without a cylinder pressure sensor.

For a third example only, the indicated work determination module 502 may determine the indicated work 510 for a combustion cycle of the cylinder 114 using the equation:

$$W = (\omega_e^2 - \omega_s^2) + (\omega_y^2 - \omega_x^2), \tag{5}$$

where W is the indicated work 510, $\omega_e$ is a first engine speed 210 at a first predetermined crankshaft position of the expansion stroke of the combustion cycle of the cylinder 114, $\omega_s$ is a second engine speed 210 at a second predetermined crankshaft position of the expansion stroke, $\omega_y$ is a third engine speed 210 at a third predetermined crankshaft position of the compression stroke of the combustion cycle of the cylinder 114, and $\omega_x$ is a fourth engine speed 210 at a fourth predetermined crankshaft position of the compression stroke. The first predetermined crankshaft position is later in the expansion stroke than the second predetermined crankshaft position, and the fourth predetermined crankshaft position is later in the compression stroke (i.e., more toward TDC) than the third predetermined crankshaft position. For example only, the first, second, third, and fourth predetermined crankshaft positions may be approximately 36 CAD after TDC, 30 CAD after TDC, 60 CAD before TDC, and 24 CAD before TDC, respectively.

For a fourth example only, the indicated work determination module 502 may determine the indicated work 510 for a combustion cycle of the cylinder 114 using the equation:

$$W = p*(\omega_e^2 - \omega_s^2) + q*(\omega_y^2 - \omega_x^2) + r, \tag{6}$$

where W is the indicated work 510, $\omega_e$ is a first engine speed 210 at a first predetermined crankshaft position of the expansion stroke of the combustion cycle of the cylinder 114, $\omega_s$ is a second engine speed 210 at a second predetermined crankshaft position of the expansion stroke, $\omega_y$ is a third engine speed 210 at a third predetermined crankshaft position of the compression stroke of the combustion cycle of the cylinder 114, $\omega_x$ is a fourth engine speed 210 at a fourth predetermined crankshaft position of the compression stroke, p and q are first and second predetermined gains, respectively, and r is a predetermined offset. The first predetermined crankshaft position is later in the expansion stroke than the second predetermined crankshaft position, and the fourth predetermined crankshaft position is later in the compression stroke than the third predetermined crankshaft position. The first and second predetermined gains (p and q) and the predetermined offset (r) may be determined in a similar manner to that described above in conjunction with equations (2)-(4).

For a fifth example only, the indicated work determination module 502 may determine the indicated work 510 for a combustion cycle of the cylinder 114 using the equation:

$$W = p*\omega_p^2 + q*\omega_q^2 + r*\omega_r^2 + s*\omega_s^2 + t*\omega_t^2 + u*\omega_u^2 + v, \tag{7}$$

where W is the indicated work 510, $\omega_p$, $\omega_q$, $\omega_r$, $\omega_s$, $\omega_t$, and $\omega_u$ are first, second, third, fourth, fifth, and sixth engine speeds 210 at first, second, third, fourth, fifth, and sixth predetermined crankshaft positions of the combustion cycle of the cylinder 114, respectively, p, q, r, s, t, and u are first, second, third, fourth, fifth, and sixth predetermined gains, and v is a predetermined offset. For example only, the first, second, third, fourth, fifth, and sixth predetermined crankshaft positions may be approximately 72 CAD before TDC, 36 CAD before TDC, 24 CAD before TDC, 12 CAD after TDC, 30 CAD after TDC, and 36 CAD after TDC, respectively. The first, second, third, fourth, fifth and sixth predetermined gains (p, q, r, s, t, and u) and the predetermined offset (v) may be determined in a similar manner to that described above in conjunction with equations (2)-(4). In various implementations, the indicated work determination module 502 may determine the indicated work 510 using another suitable function or mapping that relates two or more squares of engine speed 210 to the indicated work 510.

The IMEP determination module 506 determines the IMEP 514 for the combustion cycle of the cylinder 114 based on the indicated work 510 for the combustion cycle of the cylinder 114. The IMEP determination module 506 may determine the IMEP 514 further based on a displacement volume of the engine 102. For example only, the IMEP determination module 506 may set the IMEP 514 equal to the indicated work 510 for the combustion cycle divided by the displacement volume of the engine 102. The displacement volume of the engine 102 is a predetermined value that may be stored in memory. As the IMEP 514 is determined from the indicated work 510 determined specifically for the combustion event of the cylinder 114, the IMEP 514 can be referred to as an absolute IMEP and not as a relative IMEP that is determined relative to other cylinders of the engine 102. As stated above, the ECM 160 may perform one or more actions based on the IMEP 514.

Figure 6:
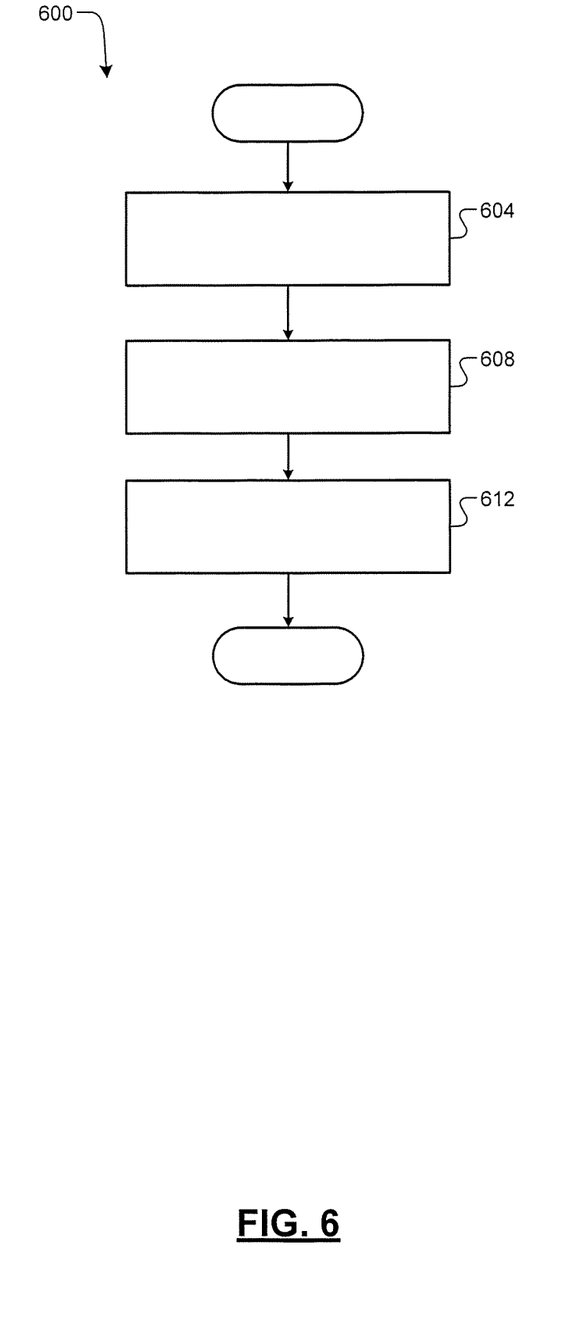
FIG. 6 is a flowchart depicting an example method of determining indicated mean effective pressure (IMEP) for a combustion cycle of a cylinder of an engine according to the principles of the present disclosure.

Referring now to FIG. 6, a flowchart depicting an example method 600 of determining the IMEP 514 for a combustion cycle of the cylinder 114 is presented. Control begins with 604 where control generates the engine speeds 210 at various crankshaft positions during the combustion cycle of the cylinder 114.

At 608, control determines the indicated work 510 of the combustion cycle of the cylinder 114 based on the squares of two or more of the engine speeds 210 at predetermined crankshaft positions, respectively, of the combustion cycle. For example only, control may determine the indicated work 510 using equation (1), (2), (5), (6), (7), or another suitable function that relates the squares of the engine speeds 210 to the indicated work 510. Control determines the IMEP 514 of the combustion cycle of the cylinder 114 based on the indicated work 510 of the combustion cycle at 612. Control may determine the IMEP 514 of the combustion cycle further based on the displacement volume of the engine 102. Control may take one or more actions based on the IMEP 514.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
   a first electronic circuit that generates engine speeds based on positions of teeth of a toothed wheel that rotates with a crankshaft of an engine and based on a crankshaft position signal generated by a crankshaft position sensor,
   wherein the crankshaft position sensor generates the crankshaft position signal based on rotation of the toothed wheel; and
   a second electronic circuit that generates an indicated work for a combustion cycle of a cylinder of the engine based on squares of first and second ones of the engine speeds;
   a third electronic circuit that generates an indicated mean effective pressure (IMEP) for the combustion cycle of the cylinder based on the indicated work and a displacement volume of the engine; and
   at least one of:
     a fourth electronic circuit that selectively adjusts fueling of a future combustion cycle of the cylinder based on the IMEP;
     a fifth electronic circuit that selectively adjusts spark timing of the future combustion cycle of the cylinder based on the IMEP;
     a sixth electronic circuit that selectively adjusts throttle opening based on the IMEP; and
     a seventh electronic that selectively adjusts opening of at least one of an intake valve and an exhaust valve of the cylinder based on the IMEP.

2. The system of claim 1 wherein the second electronic circuit sets the indicated work using the equation:

$$W=\omega_e^2-\omega_s^2$$

where W is the indicated work, $\omega_e$ is the first one of the engine speeds at a first predetermined crankshaft position of the expansion stroke of the combustion cycle of the cylinder, $\omega_s$ is the second one of the engine speeds at a second predetermined crankshaft position of the combustion cycle, and the first predetermined crankshaft position is later in the combustion cycle than the second predetermined crankshaft position.

3. The system of claim 1 wherein the second electronic circuit sets the indicated work using the equation:

$$W=p*(\omega_e^2-\omega_s^2)+q$$

where W is the indicated work, $\omega_e$ is the first one of the engine speeds at a first predetermined crankshaft position of the expansion stroke of the combustion cycle of the cylinder, $\omega_s$ is the second one of the engine speeds at a second predetermined crankshaft position of the combustion cycle, p is a predetermined gain, q is a predetermined offset, and the first predetermined crankshaft position is later in the combustion cycle than the second predetermined crankshaft position.

4. The system of claim 1 wherein the second electronic circuit sets the indicated work using the equation:

$$W=(\omega_e^2-\omega_s^2)+(\omega_y^2-\omega_x^2)$$

where W is the indicated work, $\omega_e$ is the first one of the engine speeds at a first predetermined crankshaft position of the expansion stroke of the combustion cycle of the cylinder, $\omega_s$ is the second one of the engine speeds at a second predetermined crankshaft position of the expansion stroke, $\omega_y$ is a third one of the engine speeds at a third predetermined crankshaft position of the compression stroke of the combustion cycle of the cylinder, $\omega_x$ is a fourth one of the engine speeds at a fourth predetermined crankshaft position of the compression stroke, the first predetermined crankshaft position is later in the expansion stroke than the second predetermined crankshaft position, and the fourth predetermined crankshaft position is later in the compression stroke than the third predetermined crankshaft position.

5. The system of claim 1 wherein the second electronic circuit sets the indicated work using the equation:

$$W=p(\omega_e^2-\omega_s^2)+q*(\omega_y^2-\omega_x^2)+r$$

where W is the indicated work, $\omega_e$ is the first one of the engine speeds at a first predetermined crankshaft position of the expansion stroke of the combustion cycle of the cylinder, $\omega_s$ is the second one of the engine speeds at a second predetermined crankshaft position of the expansion stroke, $\omega_y$ is a third one of the engine speeds at a third predetermined crankshaft position of the compression stroke of the combustion cycle of the cylinder, $\omega_x$ is a fourth one of the engine speeds at a fourth predetermined crankshaft position of the compression stroke, p and q are first and second predetermined gains, respectively, r is a predetermined offset, the first predetermined crankshaft position is later in the expansion stroke than the second predetermined crankshaft position, and the fourth predetermined crankshaft position is later in the compression stroke than the third predetermined crankshaft position.

6. The system of claim 1 wherein the second electronic circuit sets the indicated work using the equation:

$$W=p*\omega_p^2+q*\omega_q^2+r*\omega_r^2+s*\omega_s^2+t*\omega_t^2+u*\omega_u^2+v$$

where W is the indicated work, $\omega_p$, $\omega_q$, $\omega_r$, $\omega_s$, $\omega_t$, and $\omega_u$ are first, second, third, fourth, fifth, and sixth ones of the engine speeds at first, second, third, fourth, fifth, and sixth predetermined crankshaft positions of the combustion cycle of the cylinder, respectively, p, q, r, s, t, and u are first, second, third, fourth, fifth, and sixth predetermined gains, and v is a predetermined offset.

7. The system of claim 1 further comprising an eighth electronic circuit that detects the occurrence of misfire within the cylinder based on the IMEP.

8. The system of claim 1 further comprising an eighth electronic circuit that diagnoses the presence of a fault in the vehicle based on the IMEP.

9. The system of claim 1 wherein the first, second, and third electronic circuits include at least one of: an Application Specific Integrated Circuit (ASIC); a combinational logic circuit; a field programmable gate array (FPGA); and a processor and memory including code that is executed by the processor.

* * * * *